(12) United States Patent
Lowe et al.

(10) Patent No.: US 9,528,635 B2
(45) Date of Patent: Dec. 27, 2016

(54) LINE SET DUCT WITH CHANNEL CLIP

(71) Applicant: Diversitech Corporation, Conyers, GA (US)

(72) Inventors: Bryce Lowe, Atlanta, GA (US); Emanuel Jones, Atlanta, GA (US); Jonathan Sada, Lawrenceville, GA (US)

(73) Assignee: Diversitech Corporation, Conyers, GA (US)

( * ) Notice: Subject to any disclaimer, the term of this patent is extended or adjusted under 35 U.S.C. 154(b) by 0 days.

(21) Appl. No.: 14/933,541

(22) Filed: Nov. 5, 2015

(65) Prior Publication Data

US 2016/0238163 A1    Aug. 18, 2016

Related U.S. Application Data

(60) Provisional application No. 62/117,067, filed on Feb. 17, 2015.

(51) Int. Cl.
*F16L 3/26* (2006.01)
*F16L 57/00* (2006.01)

(52) U.S. Cl.
CPC . *F16L 3/26* (2013.01); *F16L 57/00* (2013.01)

(58) Field of Classification Search
USPC ................................. 174/68.1, 68.3
See application file for complete search history.

(56) References Cited

U.S. PATENT DOCUMENTS 5,639,048 A * 6/1997 Bartholomew ........... F16L 3/26
248/49
5,730,398 A * 3/1998 Shimizu ............... H02G 3/0456
248/49

* cited by examiner

*Primary Examiner* — Dhirubhai R Patel
(74) *Attorney, Agent, or Firm* — Smith Gambrell & Russell LLP

(57) ABSTRACT

An HVAC line set duct system includes a line set duct with a channel clip. The duct houses an HVAC line set and includes a channel connector for slidably securing the channel clips along the length of the line set duct. The channel clips have collars that engage tie wraps that in turn secure the HVAC line set to the line set duct. The channel clips are installed onto the line set channel connector by exerting a force perpendicular to the length of the line set duct so that the channel clips snap onto the channel connector and slide along the channel connector.

10 Claims, 9 Drawing Sheets

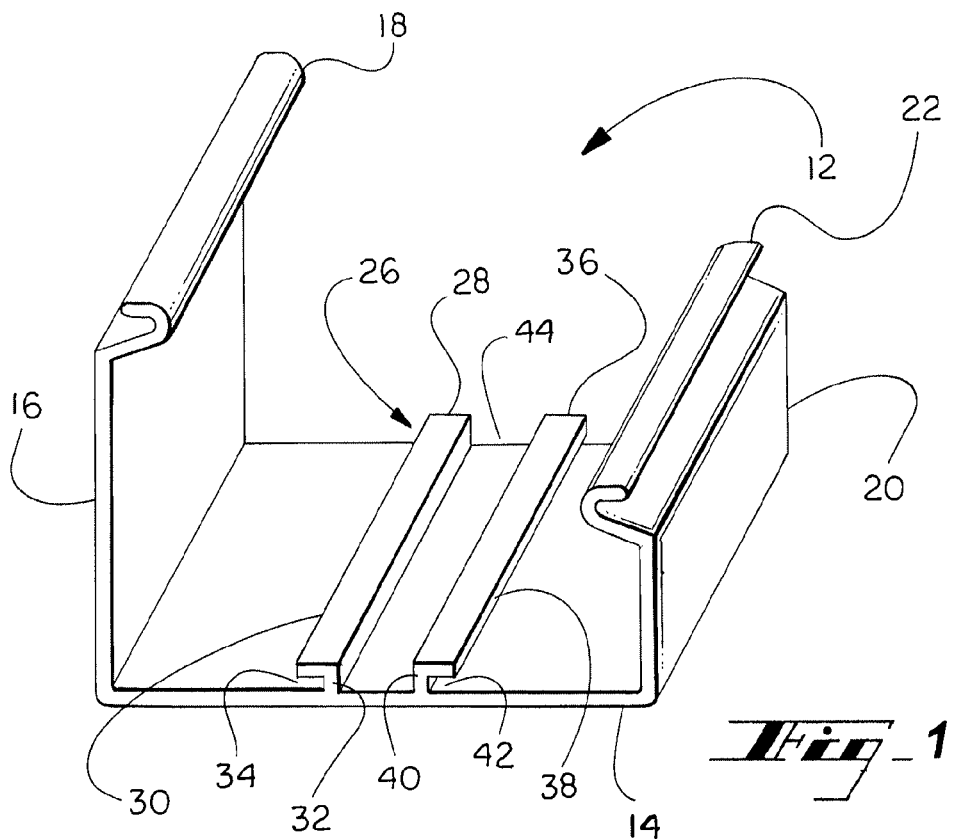
Fig_1
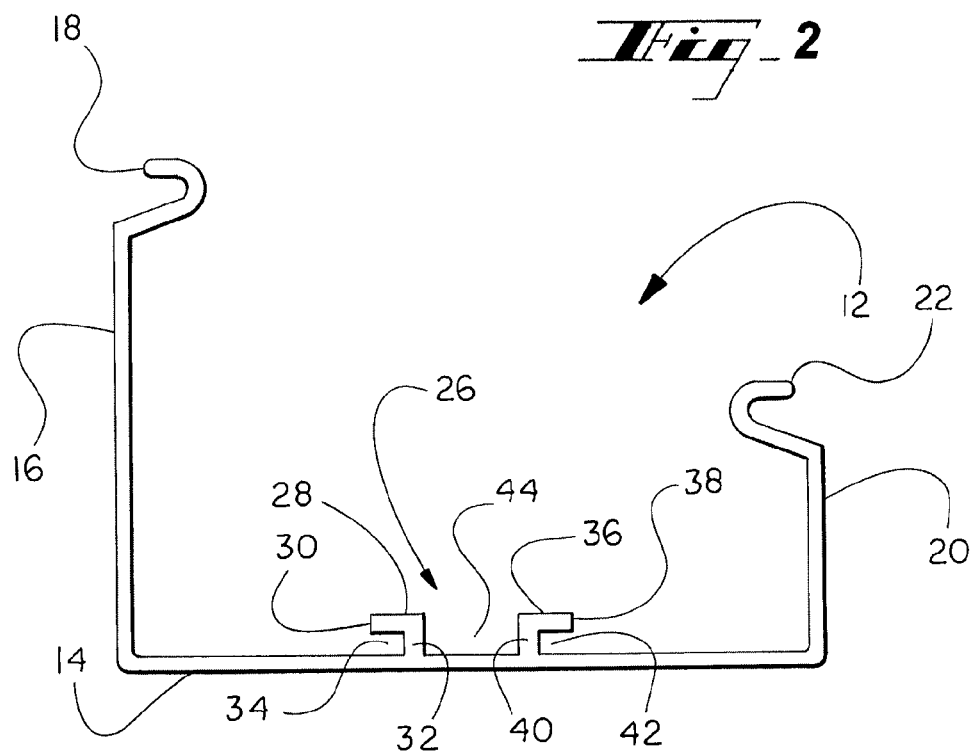
Fig_2

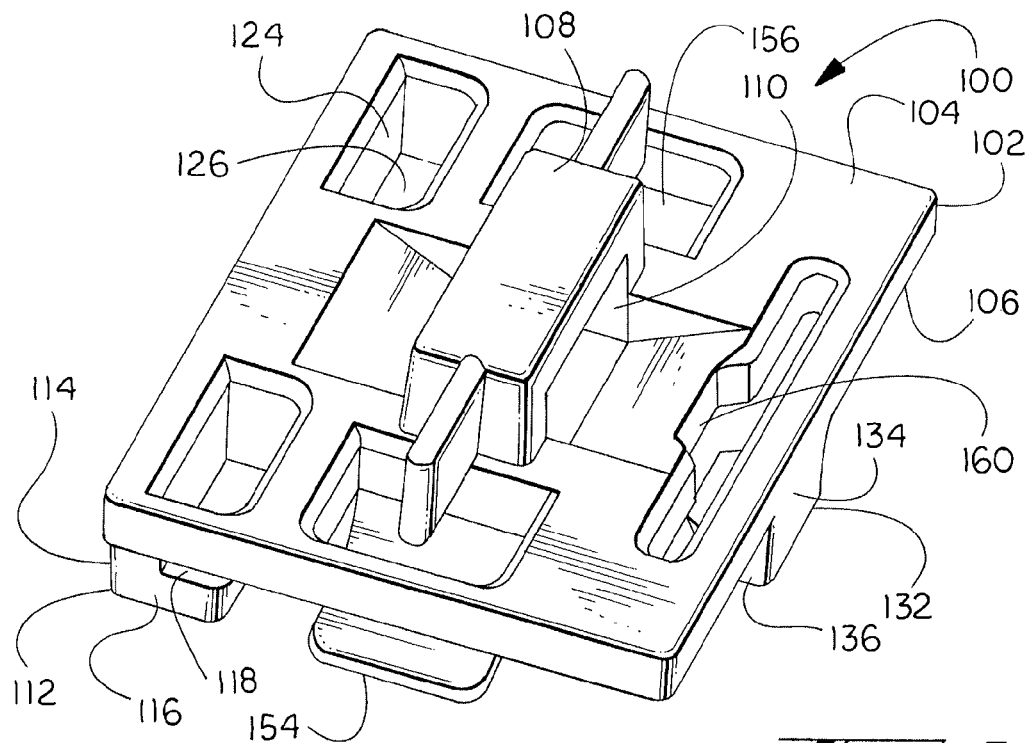
Fig_5
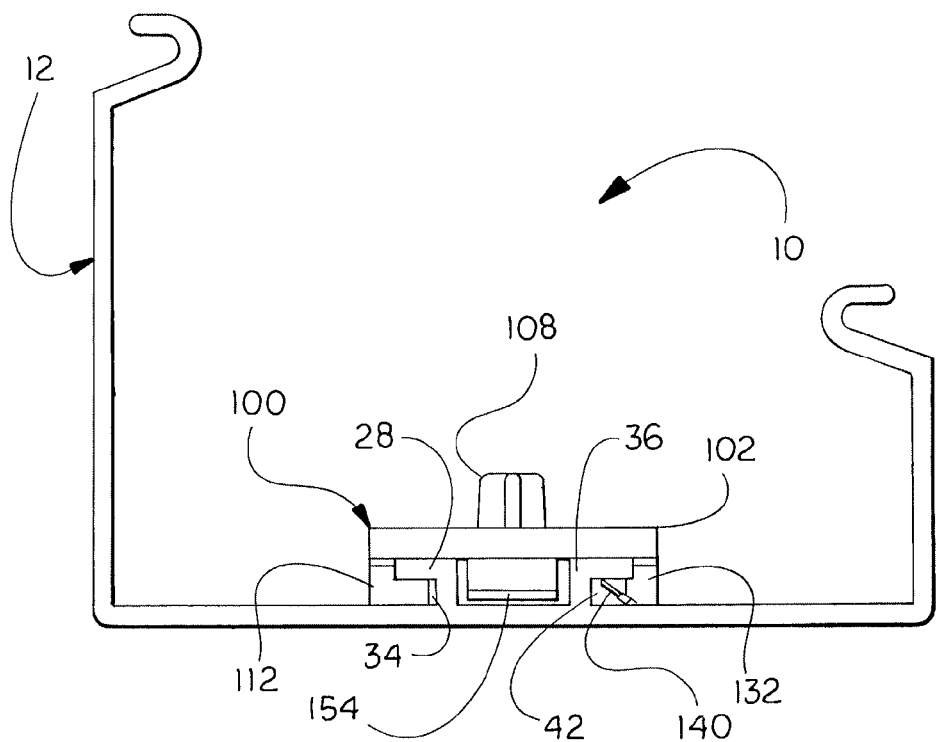
Fig_6

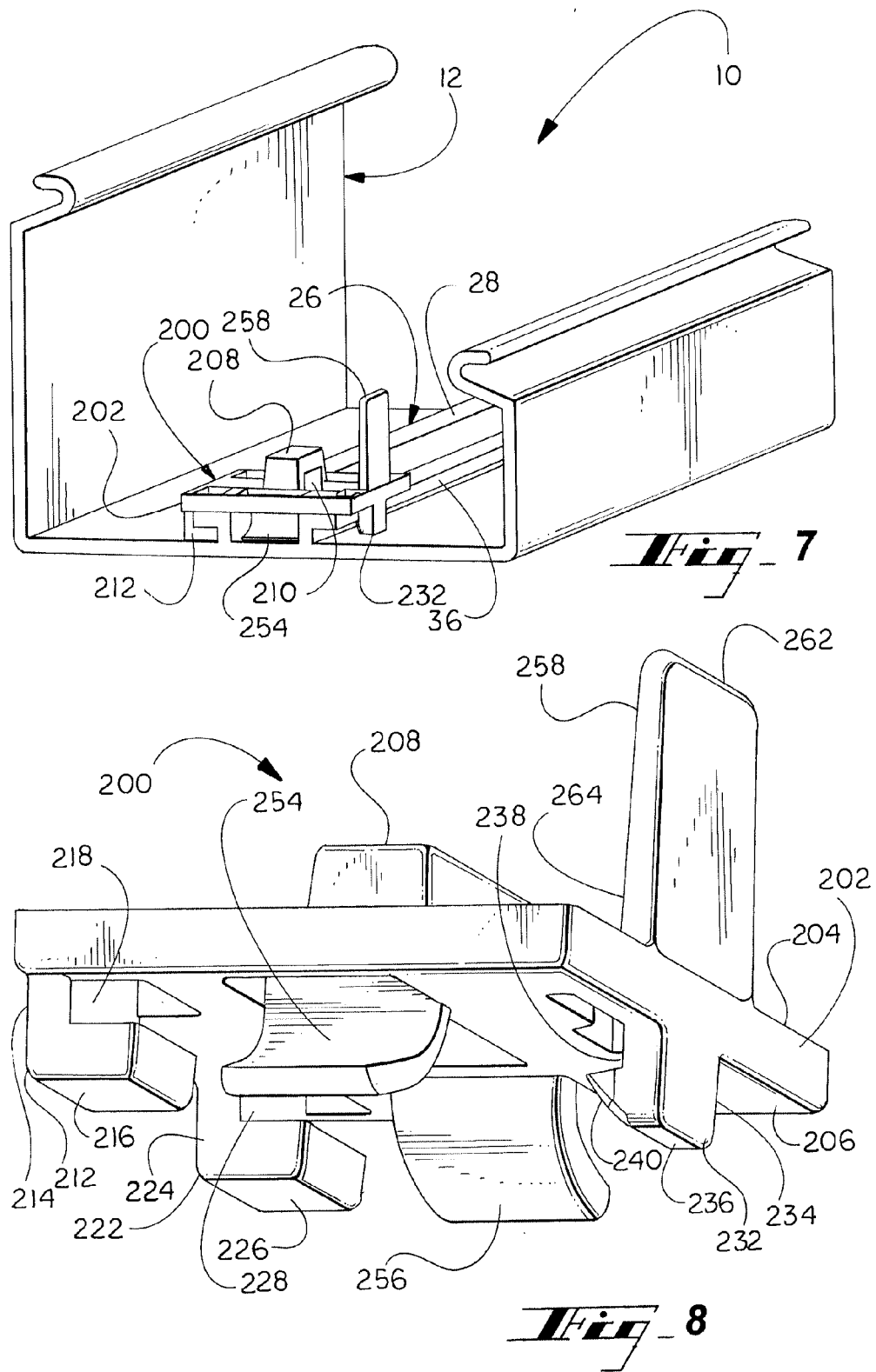

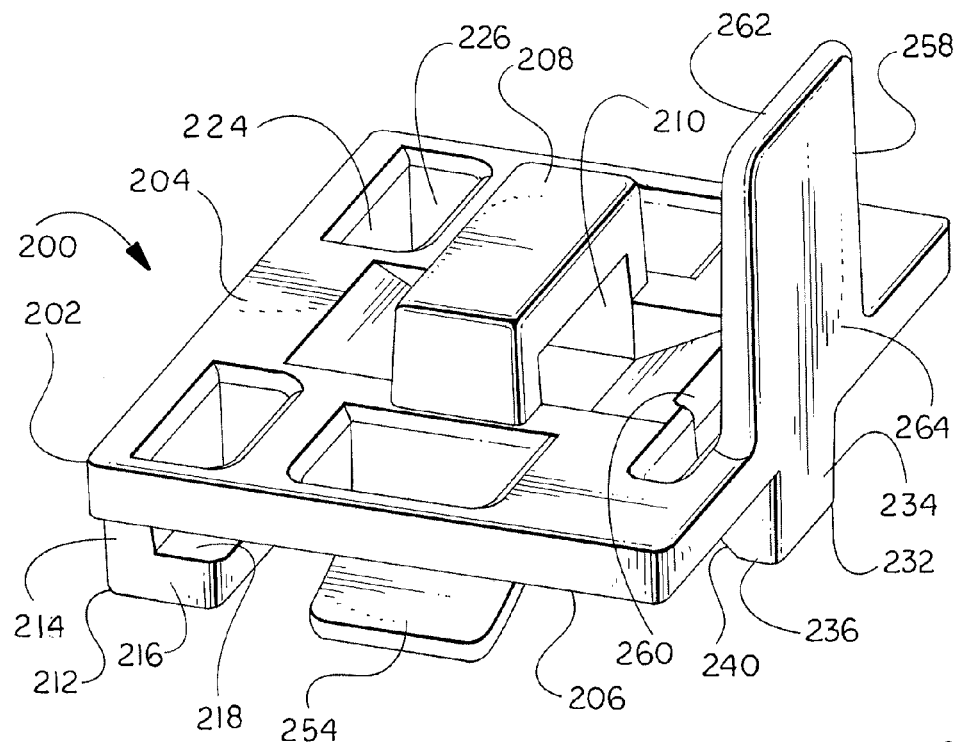
Fig_9
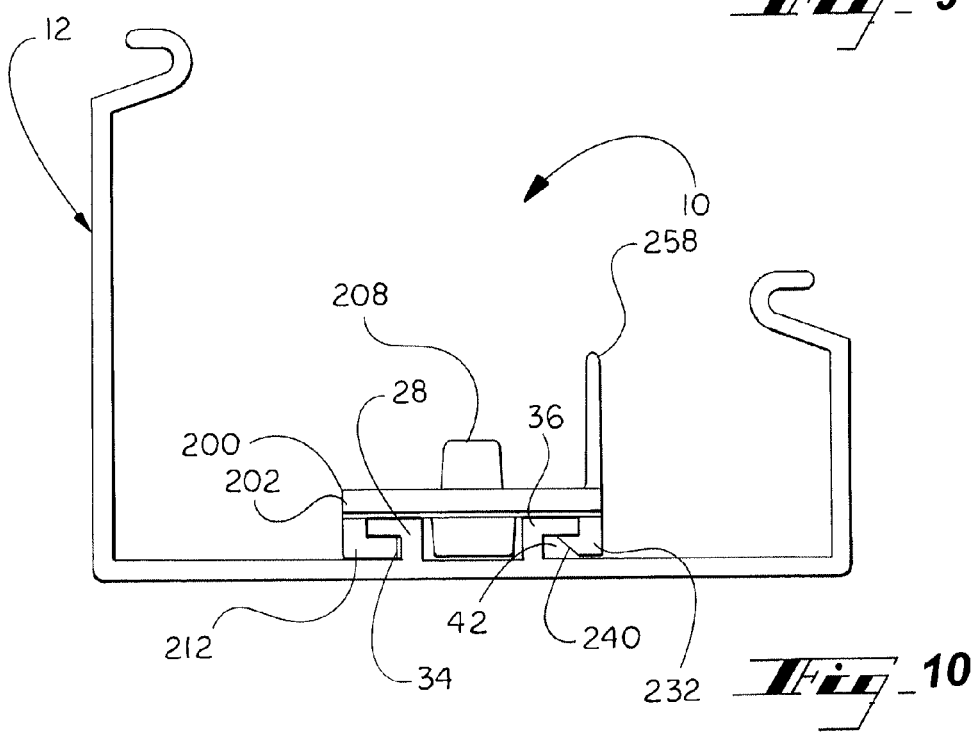
Fig_10

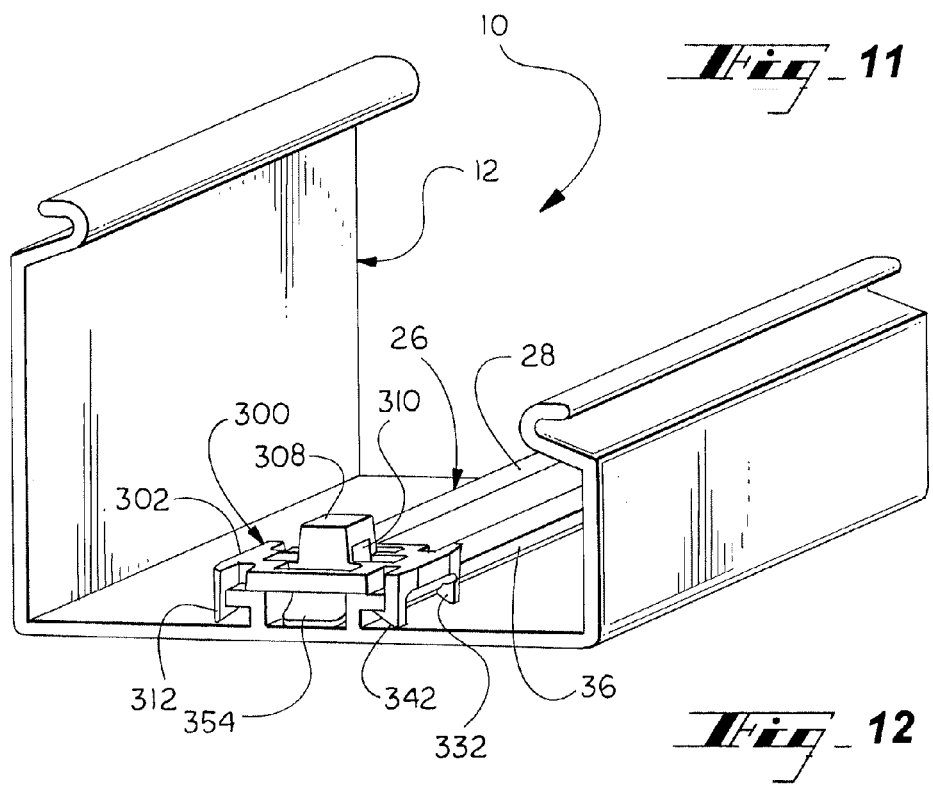
Fig_11
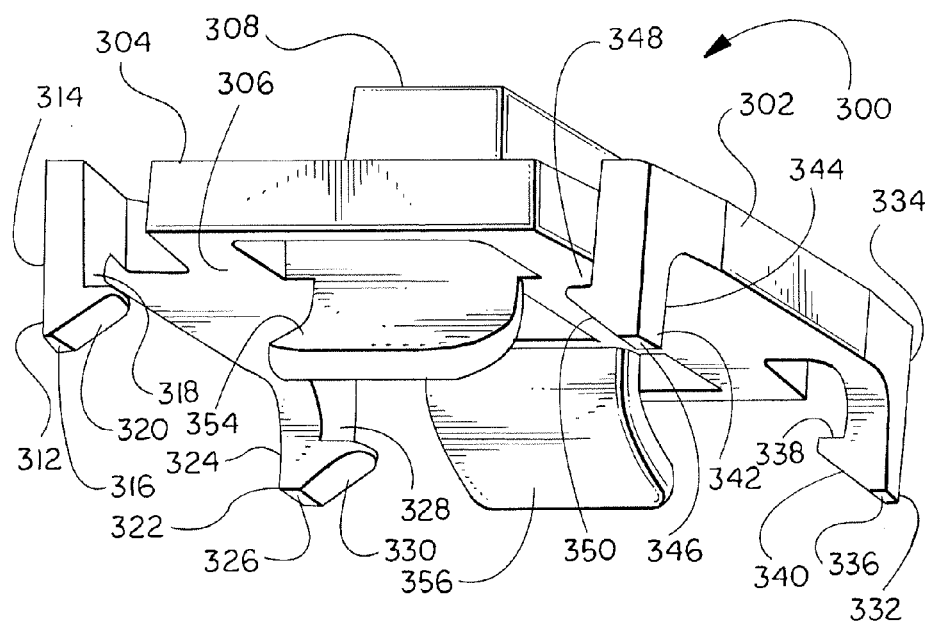
Fig_12

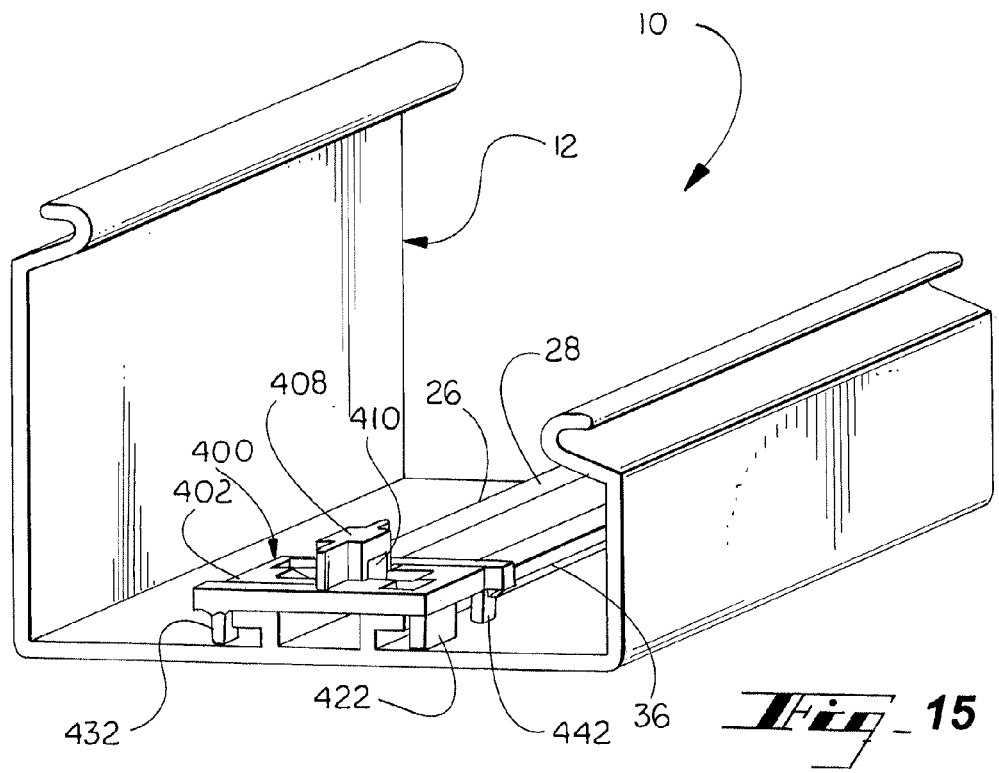
Fig_15
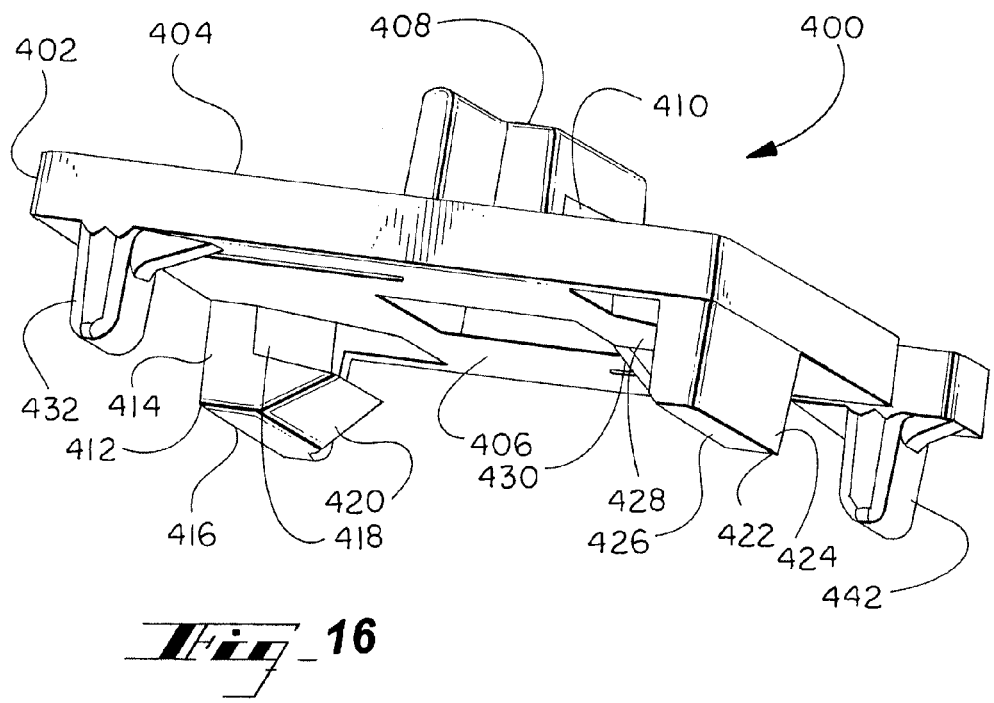
Fig_16

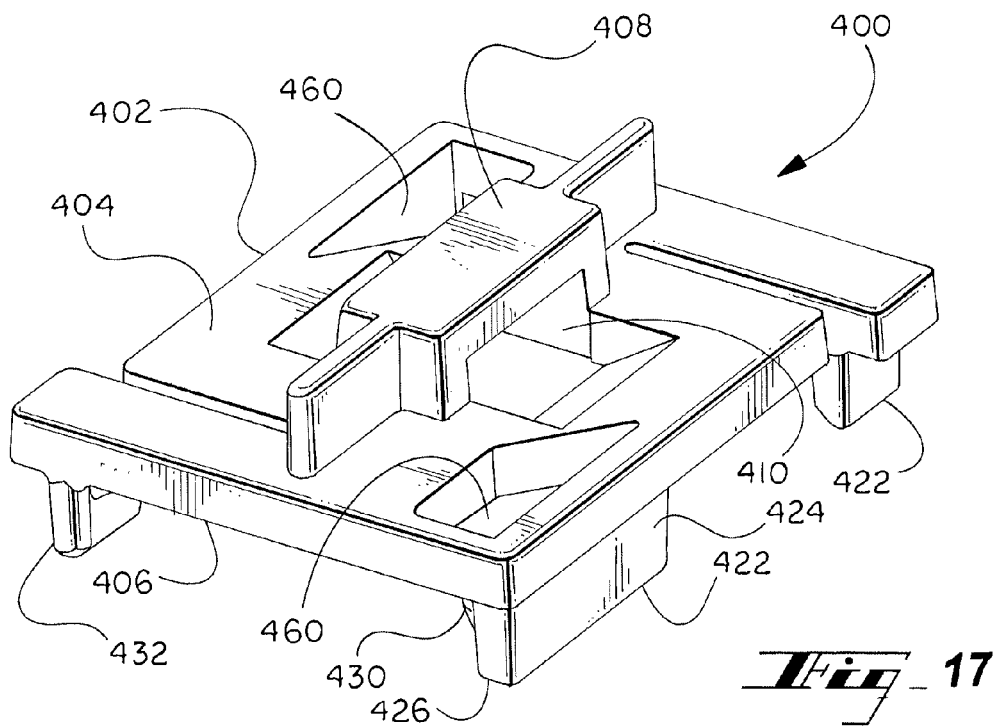
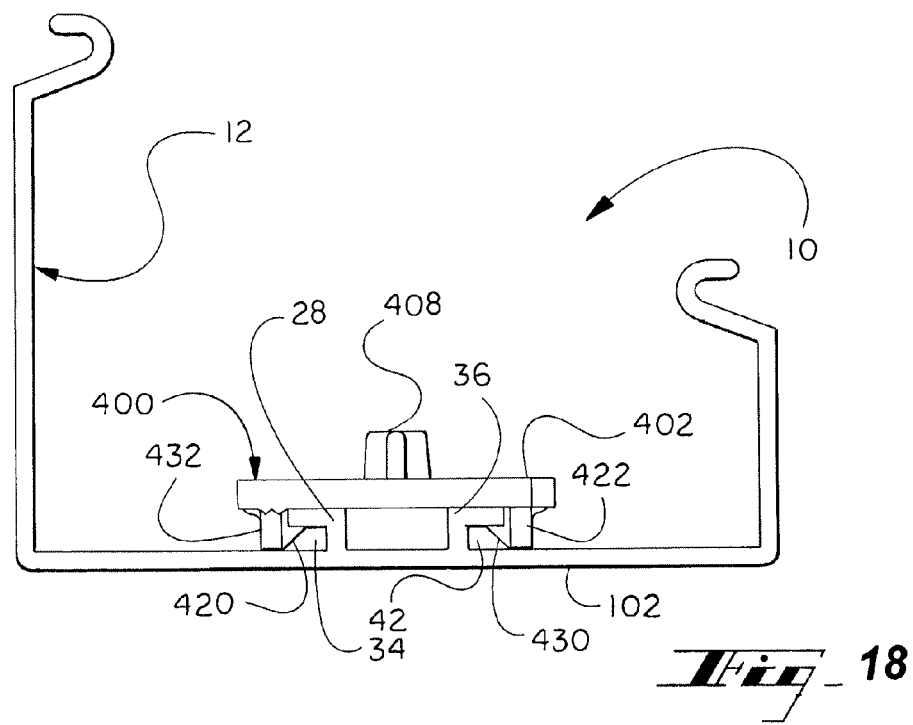

LINE SET DUCT WITH CHANNEL CLIP

CROSS REFERENCE TO RELATED PATENT APPLICATIONS

This invention claims priority from U.S. Provisional Patent Application No. 62/117,067, filed Feb. 17, 2015, which is hereby incorporated by reference.

FIELD OF THE INVENTION

This invention relates to a line set duct system for housing an HVAC line set running between a condenser and an evaporator of an HVAC system, and more specifically to a line set duct system including a duct with a channel and a channel clip for holding the line set in place within the duct.

BACKGROUND OF THE INVENTION

An HVAC line set includes at least an evaporator line and a suction line that run between the condenser outside a building and the evaporator inside the building that is heated or cooled by the HVAC system. Between the condenser and the evaporator the line set may be outside the building and exposed. The line set duct system includes a line set duct that encloses the line set to protect the line set and to hide the line set from view. In order to protect the line set within the line set duct and keep the line set from moving and vibrating within the line set duct, an integral channel with a series of channel clips extends along the length of the line set duct. The channel clips engage the channel and can slide along the channel. The line set is secured to the channel clips, and therefore to the channel by means of tie wraps attached to the channel clips.

SUMMARY OF THE INVENTION

The line set duct system of the present invention includes a line set duct for housing the line set of the HVAC system and a series of channel clips for securing the line set within the line set duct. The line set duct includes a longitudinally extending duct base with a longitudinally extending integral channel connector, longitudinally extending side walls, and a removable longitudinally extending cover. A channel connector includes a first inverted L-shaped channel member and a second inverted L-shaped channel member attached to the duct base, extending along the length of the duct base, and extending parallel to each other. Each channel member has an inverted L-shaped cross-section consisting of a channel lip and a channel web. The channel webs are attached to the duct base. The two inverted L-shaped channel members are oriented to create two outward facing outside channel grooves. The two outside channel grooves are formed by the channel lips, the channel webs, and the duct base. A center channel groove is created between the channel connectors of the inverted L-shaped channel members.

In a first embodiment, the channel clip has a generally planar and rectangular clip base with a top and bottom. Two legs, a first leg and a second leg, are attached at one side of the clip base and extend downwardly. The first leg and the second leg each have a downwardly extending portion and a perpendicularly extending portion attached to the lower end of the downwardly extending portion. A third leg is attached to an opposite side of the clip base and extends downwardly. The third leg has a downwardly extending portion and a perpendicularly extending portion attached to the lower end of the downwardly extending portion. The downwardly extending portions of the legs, the perpendicularly extending portions of the legs and the bottom of the clip base form leg grooves. In addition, the perpendicularly extending portion of the third leg has a camming surface distal from the clip base. A tool opening in the clip base allows a user to access the third leg with a tool, such as a screwdriver, in order to release the perpendicularly extending portion from the channel lip of the second L-shaped channel member. The channel clip has a clip collar with a collar opening attached to the top of the clip base for engaging a tie wrap or other fastener. The channel clip also has a pair of friction elements, a first friction element and a second friction element, extending downwardly from the center of the bottom of the clip base and dimensioned to fit within the width of the center channel groove of the channel connector.

In operation, first and second leg grooves of the first and second legs first engage the channel lip of the first L-shaped channel member. The channel clip is then pushed perpendicularly toward the duct base so that the camming surface of the third leg rides over the channel lip of the second L-shaped channel member. Once the camming surface has passed the channel lip of the second L-shaped channel member, the third leg groove engages the channel clip of the second L-shaped channel member, and the channel clip is thereby slidably attached to the channel connector. When the channel clip is thus attached to the channel connector, the first and second friction elements engage the duct base of the center channel groove to inhibit free sliding of the channel clip along the channel connector. As previously indicated, the channel clip can be removed by engaging the perpendicularly extending portion of the third leg to releasing the perpendicularly extending portion from the channel lip of the second L-shaped channel member.

A second embodiment of the invention is similar to the first embodiment described above except for the addition of a release tab attached to the top of the clip base and extending upwardly. The release tab has a top end, a bottom end, and a length. The bottom end of the release tab is attached to the top of the clip base directly above the third leg. By moving the top end of the release tab toward the center of the clip base, the torque exerted on the edge of the clip base causes the third leg to rotate. As the third leg rotates, the perpendicularly extending portion of the third leg disengages from the channel lip of the second L-shaped channel member thereby releasing the channel clip for removal. A tool opening in the clip base also allows a user to access the third leg with a tool, such as a screwdriver, in order to release the perpendicularly extending portion from the channel lip of the second L-shaped channel member.

In a third embodiment, the channel clip has a generally planar and rectangular clip base with a top and bottom. Four legs, a first leg, a second leg, a third leg, and a fourth leg, are attached at each corner of the clip base and extend downwardly. Each of the legs has a downwardly extending portion and a perpendicularly extending portion attached to the lower end of the downwardly extending portion which together with the clip base form first, second, third, and fourth leg grooves. Each of the perpendicularly extending portions of the legs has a camming surface distal from the clip base. Tool openings in the clip base allows a user to access the four legs with a tool, such as a screwdriver, in order to release the perpendicularly extending portions of the four legs from the L-shaped channel base of the second channel member. The channel clip has a clip collar with a collar opening attached to the top of the clip base for engaging a tie wrap or other fastener. The channel clip also has a pair of friction elements, a first friction element second friction element, extending downwardly from the center of the clip base and dimensioned to fit within the width of the center channel groove of the line set duct.

In operation, the channel clip is pushed perpendicularly toward the duct base so that the camming surfaces of the four legs ride over the L-shaped channel base of the both channel members. Once the camming surfaces have passed the L-shaped channel bases of the channel members, the leg grooves engage the L-shaped channel base of the channel members, and the channel clip is thereby slidably attached to the line set channel. When the channel clip is thus attached to the line set channel, the first and second friction elements engage the duct base of the center channel groove to inhibit free sliding of the channel clip along the line set channel.

In a fourth embodiment, the channel clip has a generally rectangular clip base with a top and bottom. Two legs, a first leg and a second leg, are attached at diagonal corners of the clip base and extend downwardly. The first leg and the second leg each have a downwardly extending portion and a perpendicularly extending portion attached at the lower end of the downwardly extending portion, which together with the base form first and second leg grooves. The perpendicularly extending portions of the legs have a camming surface distal from the clip base. The channel clip also has downwardly extending stubs at the corners of the base opposite the legs. Tool openings in the clip base allows a user to access the two legs with a tool, such as a screwdriver, in order to release the perpendicularly extending portions of the legs from the first and second channel lips of the first and second L-shaped channel members. The channel clip has a clip collar with a collar opening attached to the top of the clip base for engaging a tie wrap or other fastener.

In operation, the channel clip is pushed perpendicularly toward the duct base so that the camming surfaces of the two legs ride over the channel lips of the both L-shaped channel members. Once the camming surfaces have passed the channel lips of the L-shaped channel members, the leg grooves engage the channel lips of the L-shaped channel members, and the channel clip is thereby slidably attached to the channel connector. The stubs engage the channel lips of the L-shaped channel members to keep the channel clip from rotating around an axis perpendicular to the duct base.

Further objects, features and advantages will become apparent upon consideration of the following detailed description of the invention when taken in conjunction with the drawings and the appended claims.

BRIEF DESCRIPTION OF THE DRAWINGS

FIG. 1 is a top perspective view of a line set duct with its duct cover removed for a line set duct system in accordance with the present invention.

FIG. 2 is an end elevation view of the line set duct with its duct cover in accordance with the present invention.

FIG. 5 is a top perspective view of the channel clip in accordance with the first embodiment of the present invention.

FIG. 6 is an end elevation view of the line set duct system with the line set duct and the channel clip in accordance with the first embodiment of the present invention.

FIG. 7 is a top perspective view of the line set duct system with the line set duct and a channel clip in accordance with a second embodiment of the present invention.

FIG. 8 is a bottom perspective view of the channel clip in accordance with the second embodiment of the present invention.

FIG. 9 is a top perspective view of the channel clip in accordance with the second embodiment of the present invention.

FIG. 10 is an end elevation view of the line set duct system with the line set duct and the channel clip in accordance with the second embodiment of the present invention.

FIG. 11 is a top perspective view of the line set duct system with the line set duct and a channel clip in accordance with a third embodiment of the present invention.

FIG. 12 is a bottom perspective view of the channel clip in accordance with the third embodiment of the present invention.

FIG. 15 is a top perspective view of the line set duct system with the line set duct and a channel clip in accordance with a fourth embodiment of the present invention.

FIG. 16 is a bottom perspective view of the channel clip in accordance with the fourth embodiment of the present invention.

FIG. 17 is a top perspective view of the channel clip in accordance with the fourth embodiment of the present invention.

FIG. 18 is an end elevation view of the line set duct system with the line set duct and the channel clip in accordance with the fourth embodiment of the present invention.

DETAILED DESCRIPTION OF THE PREFERRED EMBODIMENT

Figure 3:
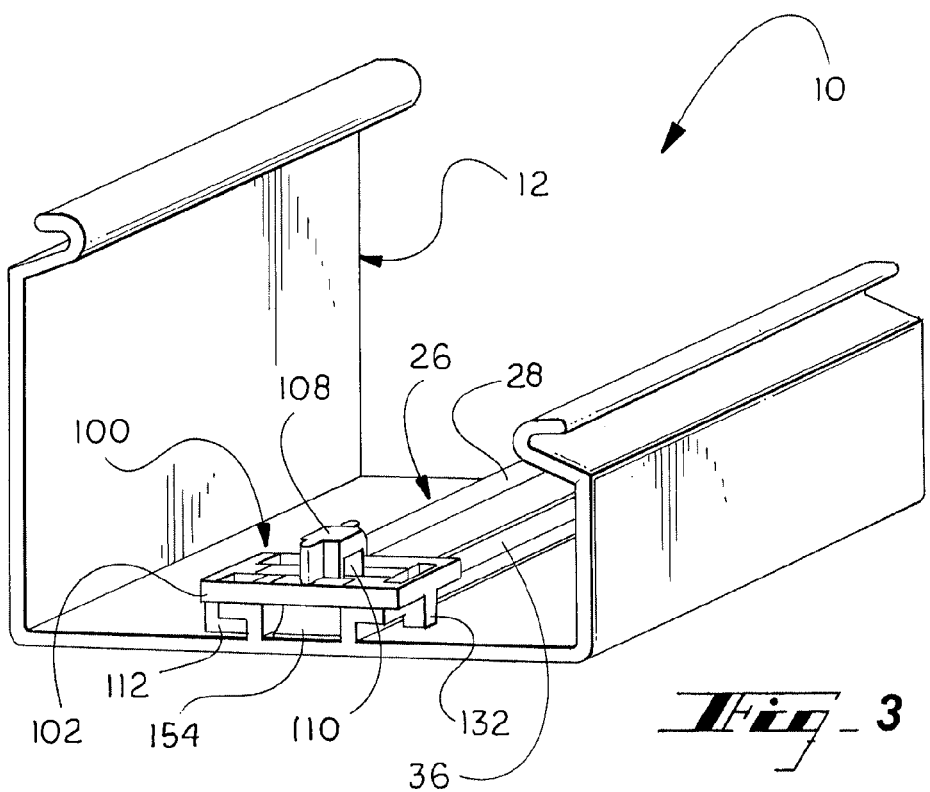
FIG. 3 is a top perspective view of the line set duct system with the line set duct and a channel clip in accordance with a first embodiment of the present invention.
Figure 4:
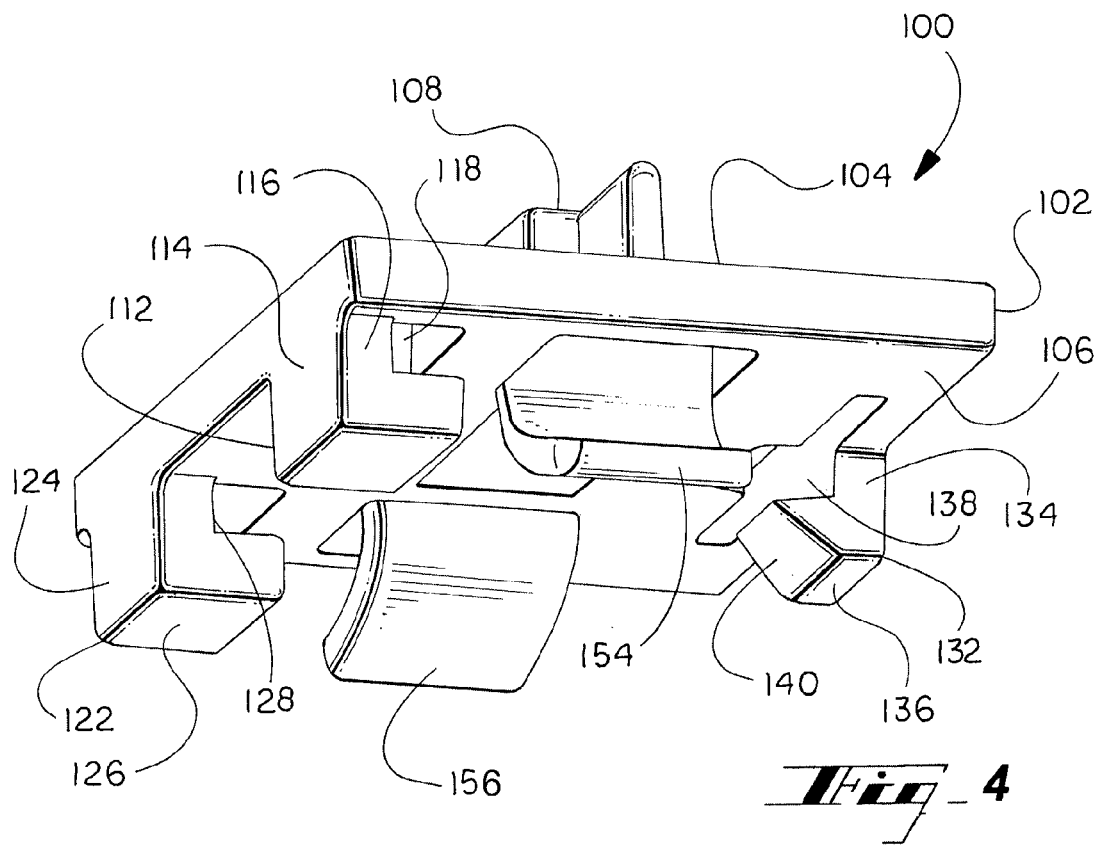
FIG. 4 is a bottom perspective view of the channel clip in accordance with the first embodiment of the present invention.
Figure 13:
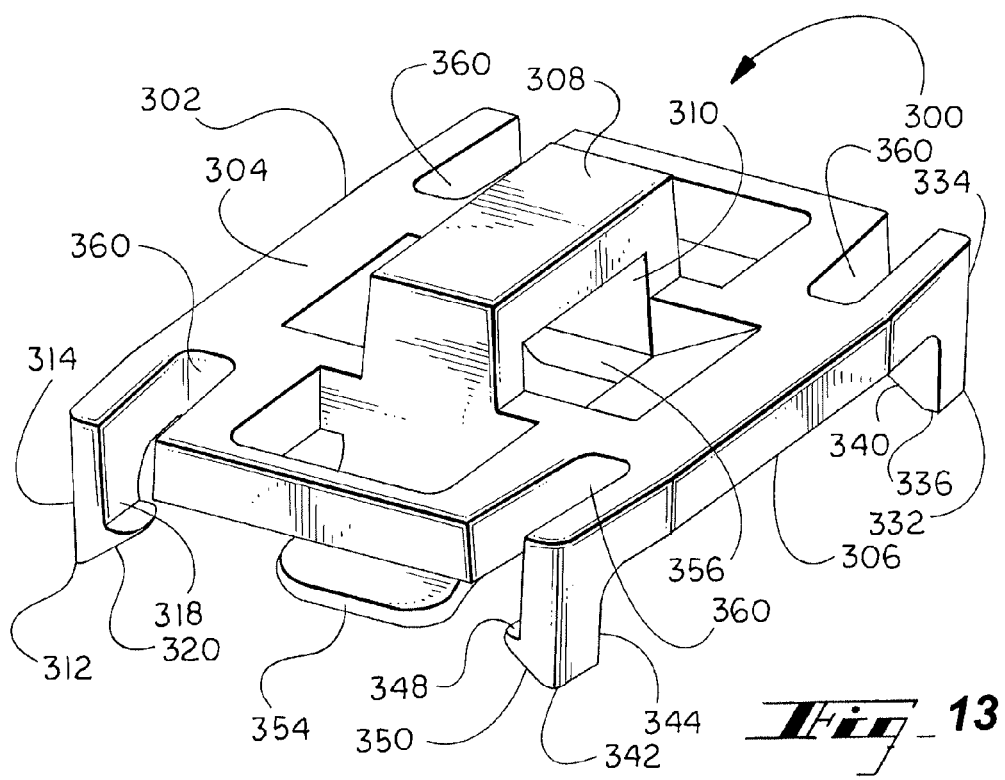
FIG. 13 is a top perspective view of the channel clip in accordance with the third embodiment of the present invention.
Figure 14:
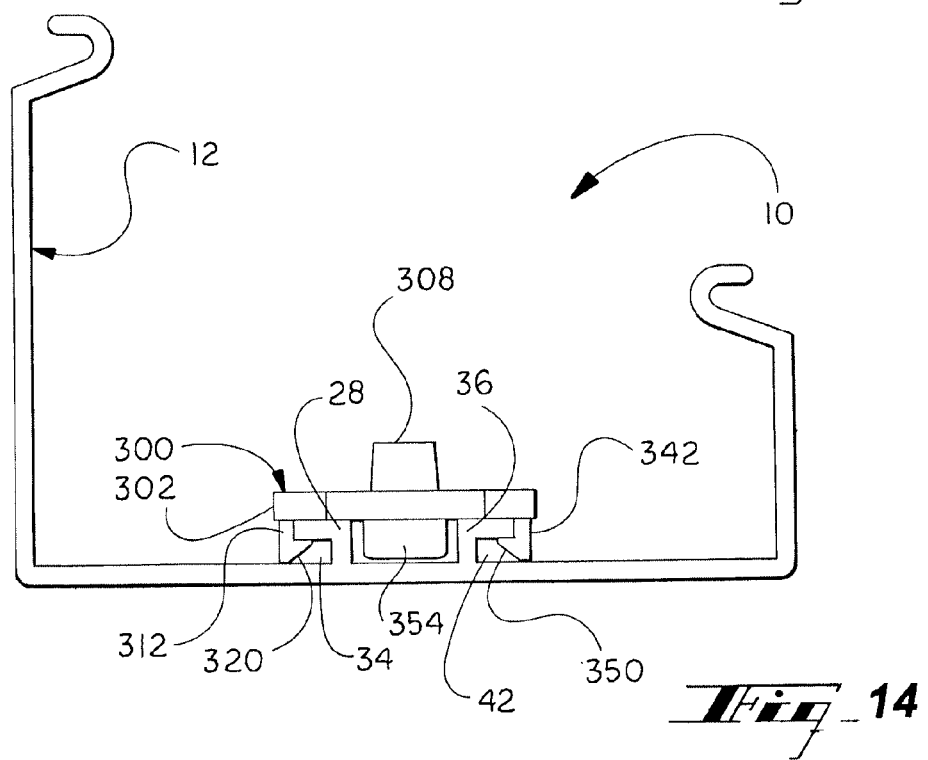
FIG. 14 is an end elevation view of the line set duct system with the line set duct and the channel clip in accordance with the third embodiment of the present invention.

Turning to FIGS. 1-3, a line set duct system 10 (FIG. 3) of the present invention includes a line set duct 12 for housing a line set (not shown) of an HVAC system and a series of channel clips (a channel clip 100—FIGS. 3-6, a channel clip 200—FIGS. 7-10, a channel clip 300—FIGS. 11-14, and a channel clip 400—FIGS. 15-18) for securing the line set within the line set duct 12. The line set duct 12 includes a longitudinally extending duct base 14 with a longitudinally extending integral channel connector 26, a longitudinally extending inside wall 16, and a longitudinally extending outside wall 20. The inside wall 16 has an inside wall top return 18, and the outside wall top return 20 has an outside wall top return 22. The inside wall top return 18 and the outside wall top return 20 engage and secure a removable longitudinally extending cover (not shown) for the line set duct 12.

The channel connector 26 includes a first inverted L-shaped channel member 28 and a second inverted L-shaped channel member 36 attached to the duct base 14, extending along the length of the duct base 14, and extending parallel to each other. Each L-shaped channel member 28 and 36 has an inverted L-shaped cross-section with channel lips 30 and 38 and an channel webs 32 and 40. The channel webs 32 and 40 are attached to the duct base 14. The two inverted L-shaped channel members 28 and 36 are oriented to create two outwardly facing outside channel grooves 34 and 42. The two outside channel grooves 34 and 42 are formed by the channel clips 30 and 38, channel webs 32 and 40, and the duct base 14. A center channel groove 44 is created between the channel webs 32 and 34 of the inverted L-shaped channel members 28 and 36.

A first embodiment of the invention is shown in FIGS. 3-6. The channel clip 100 has a generally planar and rectangular clip base 102 with a top 104 and a bottom 106. Two legs, a first leg 112 and a second leg 122, are attached at one side of the clip base 102 and extend downwardly. The first leg 112 and the second leg 122 have downwardly extending portions 114 and 124 and perpendicularly extending portions 116 and 126 attached to the lower ends of the downwardly extending portions 114 and 124, which together with the bottom 106 of the clip base 102 form a first leg groove 118 and a second leg groove 128. As used herein, the term "downwardly extending" refers to the direction toward the duct base 14. The term "perpendicularly extending" refers to the direction that is essentially perpendicular to the downwardly extending portions of the legs and therefore essentially parallel to the clip base 102. A third leg 132 is attached to an opposite side of the clip base 102 and extends downwardly. The third leg has a downwardly extending portion 134 and a perpendicularly extending portion 136 attached to the lower end of the downwardly extending portion 134, which together with the bottom 106 of the clip base 102 form a third leg groove 138. In addition, the perpendicularly extending portion 136 of the third leg 132 has a camming surface 140 distal from the bottom 106 of the clip base 102. A tool opening 160 (FIG. 5) in the clip base 102 allows a user to access the third leg 132 with a tool, such as a screwdriver, in order to release the perpendicularly extending portion 136 from the second channel lip 38 of the second L-shaped channel member 36. The channel clip 100 has a clip collar 108 with a collar opening 110 attached to the top 104 of the clip base 102 for engaging a tie wrap or other fastener. The channel clip 100 also has a pair of friction elements, a first friction element 154 and second friction element 156, extending downwardly from the center of the bottom 106 of the clip base 102 and dimensioned to fit within the width of the center channel groove 44 of the channel connector 26.

In operation, the first leg groove 118 and the second leg groove 128 of the first leg 112 and the second leg 122 of the channel clip 100 first engage the channel lip 30 of the first L-shaped channel member 28. The channel clip 100 is then pushed perpendicularly toward the duct base 14 so that the camming surface 140 of the third leg 132 rides over the channel lip 38 of the second L-shaped channel member 36. Once the camming surface 140 has passed the channel lip 38 of the second L-shaped channel member 36, the third leg groove 138 engages the channel lip 38 of the second L-shaped channel member 36, and the channel clip 100 is thereby slidably attached to the line set channel connector 26. When the channel clip 100 is thus attached to the line set channel connector 26, the first and second friction elements 154 and 156 engage the duct base 14 of the center channel groove 44 to inhibit free sliding of the channel clip 100 along the line set channel connector 26. As previously indicated, the channel clip 100 can be removed from the line set channel connector 26 by engaging the perpendicularly extending portion 136 of the third leg 132 by means of a tool inserted through the tool opening 160 to releasing the perpendicularly extending portion 136 from the channel lip 38 of the second L-shaped channel member 36. Once the perpendicularly extending portion 136 is disengaged from the channel clip 38 of the second L-shaped channel member 36, the channel clip 100 is removed by disengaging the first and second legs 112 and 122 from the channel clip 30 of the first L-shaped channel member 28.

A second embodiment of the invention is shown in FIGS. 7-10. The channel clip 200 is similar to the channel clip 100 described above except for the addition of a release tab 258. The channel clip 200 has a generally planar and rectangular clip base 202 with a top 204 and a bottom 206. Two legs, a first leg 212 and a second leg 222, are attached at one side of the clip base 202 and extend downwardly. The first leg 212 and the second leg 222 have downwardly extending portions 214 and 224 and perpendicularly extending portions 216 and 226 attached to the lower ends of the downwardly extending portions 214 and 224, which together with the bottom 206 of the clip base 202 form a first leg groove 218 and a second leg groove 228. A third leg 232 is attached to an opposite side of the clip base 202 and extends downwardly. The third leg has a downwardly extending portion 234 and a perpendicularly extending portion 236 attached to the lower end of the downwardly extending portion 234, which together with the bottom 206 of the clip base 202 form a third leg groove 238. In addition, the perpendicularly extending portion 236 of the third leg 232 has a camming surface 240 distal from the bottom 206 of the clip base 202. The channel clip 200 has a clip collar 208 with a collar opening 210 attached to the top 204 of the clip base 202 for engaging a tie wrap or other fastener. The channel clip 200 also has a pair of friction elements, a first friction element 254 and second friction element 256, extending downwardly from the center of the bottom 206 of the clip base 202 and dimensioned to fit within the width of the center channel groove 44 of the channel connector 26.

The release tab 258 is attached to the top 204 of the clip base 202 and is an upward extension of the third leg 232. The release tab 258 has a top end 262 and a bottom end 264. The bottom end 264 of the release tab is attached to the top 204 of the clip base 202 directly above the third leg 232. By moving the top end 262 of the release tab toward the center of the clip base 202, the torque exerted on the edge of the clip base 202 causes the third leg 232 to rotate. As the third leg 232 rotates, the perpendicularly extending portion 236 of the third leg 232 disengages from the channel lip 38 of the L-shaped second channel member 36 thereby releasing the channel clip 200 for removal. A tool opening 260 in the clip base 202 also allows a user to access the third leg 232 with a tool, such as a screwdriver, in order to release the perpendicularly extending portion 236 of the third leg 232 from the channel lip 38 of the second L-shaped channel member 36.

A third embodiment of the invention is shown in FIGS. 11-14. The channel clip 300 has a generally planar and rectangular clip base 302 with a top 304 and bottom 306. Four legs, a first leg 312, a second leg 322, a third leg 332, and a fourth leg 342, are attached at each corner of the clip base 302 and extend downwardly. The legs 312, 322, 332, 342 have downwardly extending portions 314, 324, 334, 344 and perpendicularly extending portions 316, 326, 336, 346 attached to the lower end of the downwardly extending portions 314, 324, 334, 344, which together with the bottom 306 the clip base 302 form first, second, third, and fourth leg grooves 318, 328, 338, and 348, respectively. The perpendicularly extending portions 316, 326, 336, 346 of the legs 312, 322, 332, 342 have camming surfaces 320, 330, 340, 350 distal from the clip base 302. Tool openings 360 in the clip base 302 allows a user to access the four legs 312, 322, 332, 342 with a tool, such as a screwdriver, in order to release the perpendicularly extending portions 316, 326, 336, 346 of the four legs 312, 322, 332, 342 from the channel lip 38 of the second L-shaped channel member 36. The channel clip 300 has a clip collar 308 with a collar opening 310 attached to the top 304 of the clip base 302 for engaging a tie wrap or other fastener. The channel clip 300 also has a pair of friction elements, a first friction element 354 and second friction element 356, extending downwardly from the center of the bottom 306 of the clip base 304 and dimensioned to fit within the width of the center channel groove 44 of the channel connector 26.

In operation, the channel clip 300 is pushed perpendicularly toward the duct base 14 so that the camming surfaces 320, 330, 340, 350 of the four legs 312, 322, 332, 342 ride over the channel lips 30, 38 of the both L-shaped channel members 28, 36. Once the camming surfaces 320, 330, 340, 350 have passed the channel lips 30, 38 of the channel L-shaped members 28, 36, the leg grooves 318, 328, 338, 348 engage the channel bases 30, 38 of the L-shaped channel members 28, 36, and the channel clip 300 is thereby slidably attached to the line set channel connector 26. When the channel clip 300 is thus attached to the line set channel connector 26, the first and second friction elements 354 and 356 engage the duct base 14 of the center channel groove 44 to inhibit free sliding of the channel clip 300 along the line set channel connector 26.

A fourth embodiment of the invention is shown in FIGS. 15-18. The channel clip 400 has a generally planar and rectangular clip base 402 with a top 404 and bottom 406. Two legs, a first leg 412 and a second leg 422, are attached at diagonal corners of the clip base 402 and extend downwardly. The first leg 412 and the second leg 422 have downwardly extending portions 414, 424 and perpendicularly extending portions 416, 426 attached to the lower end of the downwardly extending portions 414, 424, which together with the clip base 402 form a first leg groove 418 and a second leg groove 428. The perpendicularly extending portions 416, 426 of the legs 412, 422 have camming surfaces 420, 430 distal from the clip base 402. The channel clip 400 also has downwardly extending stubs 432, 442 at the corners of the clip base 402 diagonally opposite the legs 412, 422. Tool openings 460 in the clip base 402 allows a user to access the two legs 412, 422 with a tool, such as a screwdriver, in order to release the perpendicularly extending portions 416, 426 of the legs 412, 422 from the channel lips 30, 38 of the L-shaped channel members 28, 36. The channel clip 400 has a clip collar 408 with a collar opening 410 attached to the top 404 of the clip base 402 for engaging a tie wrap or other fastener.

In operation, the channel clip 400 is pushed perpendicularly toward the duct base 14 so that the camming surfaces 420, 430 of the two legs 412, 422 ride over the channel bases 30, 38 of the both L-shaped channel members 28, 36. Once the camming surfaces 420, 430 have passed the channel lips 30, 38 of the L-shaped channel members 28, 36, the leg grooves 418, 428 engage the channel lips 30, 38 of the L-shaped channel members 28, 36, and the channel clip 400 is thereby slidably attached to the line set channel connector 26. The stubs 432, 442 engage the L-shaped channel members 28, 36 to keep the channel clip 400 from rotating around an axis perpendicular to the duct base 14.

While this invention has been described with reference to preferred embodiments thereof, it is to be understood that variations and modifications can be affected within the spirit and scope of the invention as described herein and as described in the appended claims.

We claim:

1. A line set duct system for housing and securing an HVAC line set, the line set duct system comprising:
   a. a line set duct with a length for enclosing the line set and including a duct base, a line set channel connector extending along the length of the duct base of the line set duct, the line set channel connector including a center channel and first and second opposing channel grooves, each channel groove comprising a channel web and a channel lip; and
   b. at least one channel clip slidably attached to the line set channel connector including:
      i. a clip base;
      ii. a camming leg attached to the clip base, the camming leg having:
         (a) a downwardly extending portion;
         (b) a perpendicularly extending portion connected to the downwardly extending portion, the perpendicularly extending portion for slidably engaging the first channel groove of the line set channel connector; and
         (c) a camming surface on the perpendicularly extending portion for urging the downwardly extending portion of the camming leg away from the first opposing channel groove as the camming leg moves toward the duct base before the perpendicularly extending portion enters the first opposing channel groove; and
      iii. a collar attached to the clip base for engaging a fastener that secures the line set to the line set channel of the line set duct.

2. The line set duct system of claim 1, wherein the camming leg is attached to a side of the clip base, wherein the clip base has a first leg and a second leg attached to an opposite side of the clip base from the camming leg, and wherein the first leg and the second leg engage the second opposing channel groove.

3. The line set duct system of claim 1, wherein the clip base has an opening to allow access to the camming leg in order to disengage the perpendicularly extending portion from the first opposing channel groove thereby disengaging the channel clip from the line set channel connector of the line set duct.

4. The line set duct system of claim 1, wherein the channel clip has a release tab attached to a side of the clip base adjacent the camming leg and extending away from the camming leg and wherein displacing the release tab causes the perpendicularly extending portion of the camming leg to disengage from the first opposing channel groove thereby disengaging the channel clip from the line set channel connector of the line set duct.

5. The line set duct system of claim 1, wherein the clip base has at least one downwardly extending friction element that fits within the center channel and frictionally engages the duct base.

6. A line set duct system for housing and securing an HVAC line set, the line set duct system comprising:
   a. a line set duct with a length for enclosing the line set and including a duct base, a line set channel connector extending along the length of the duct base of the line set duct, the line set channel connector including a center channel and first and second opposing channel grooves, each opposing channel groove comprising a channel web and a channel lip; and b. at least one channel clip slidably attached to the line set channel connector including:
 i. a clip base;
 ii. a plurality of legs attached to the clip base, each of the legs having:
  (a) a downwardly extending portion;
  (b) a perpendicularly extending portion connected to the downwardly extending portion, the perpendicularly extending portion for slidably engaging the first opposing channel groove or the second opposing channel groove of the line set channel connector; and
  (c) a camming surface on the perpendicularly extending portion for urging the downwardly extending portion of the leg away from the opposing channel groove as the leg moves toward the duct base before the perpendicularly extending portion enters the opposing channel groove; and
 iii. a collar attached to the clip base for engaging a fastener that secures the line set to the line set channel of the line set duct.

7. The line set duct system of claim 6, wherein the plurality of legs includes four legs each attached to a corner of the clip base.

8. The line set duct system of claim 6, wherein the clip base has openings to allow access to the legs in order to disengage the perpendicularly extending portions from the opposing channel grooves thereby disengaging the channel clip from the line set channel connector of the line set duct.

9. The line set duct system of claim 6, wherein the clip base has at least one downwardly extending friction element that fits within the center channel and frictionally engages the duct base.

10. The line set duct system of claim 6, wherein the plurality of legs includes two legs attached to diagonally opposite corners of the clip base and wherein the channel clip has two downwardly extending stubs attached at the corners of the clip base opposite the legs.

* * * * *